US012057135B2

(12) United States Patent
Ji et al.

(10) Patent No.: US 12,057,135 B2
(45) Date of Patent: Aug. 6, 2024

(54) SPEECH NOISE REDUCTION METHOD AND APPARATUS, COMPUTING DEVICE, AND COMPUTER-READABLE STORAGE MEDIUM

(71) Applicant: Tencent Technology (Shenzhen) Company Limited, Shenzhen (CN)

(72) Inventors: Xuan Ji, Shenzhen (CN); Meng Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 286 days.

(21) Appl. No.: 17/227,123

(22) Filed: Apr. 9, 2021

(65) Prior Publication Data

US 2021/0327448 A1 Oct. 21, 2021

Related U.S. Application Data

(63) Continuation of application No. PCT/CN2019/121953, filed on Nov. 29, 2019.

(30) Foreign Application Priority Data

Dec. 18, 2018 (CN) ........................ 201811548802.0

(51) Int. Cl.
*G10L 21/0216* (2013.01)
*G10L 21/02* (2013.01)
(Continued)

(52) U.S. Cl.
CPC ...... *G10L 21/0216* (2013.01); *G10L 21/0208* (2013.01); *G10L 21/0232* (2013.01);
(Continued)

(58) Field of Classification Search
None
See application file for complete search history.

(56) References Cited

U.S. PATENT DOCUMENTS

2010/0100386 A1* 4/2010 Yu ...................... G10L 21/0208 704/E11.001
2012/0158404 A1* 6/2012 Shin .................. G10L 21/0216 704/E15.039
2016/0042746 A1 2/2016 Fujieda

FOREIGN PATENT DOCUMENTS

CN 103580632 A * 2/2014 .............. H03G 3/32
CN 103650040 A 3/2014
(Continued)

OTHER PUBLICATIONS

Lara Nahma, Pei Chee Yong, Hai Huyen Dam, Sven Nordholm; Convex combination framework for a priori SNR estimation in speech enhancement; Mar. 9, 2017; URL: https://ieeexplore.ieee.org/document/7953103 (Year: 2017).*
Feng Deng et al., "Speech Enhancement Using Generalized Weighted β-Order Spectral Amplitude Estimator", Speech Communication, Elsevier Science Publishers, Amsterdam, NL, vol. 59, Jan. 28, 2014, XP028666613, ISSN: 0167-6393, 14 pgs.
(Continued)

*Primary Examiner* — Richa Sonifrank
(74) *Attorney, Agent, or Firm* — Morgan, Lewis & Bockius LLP

(57) ABSTRACT

This application discloses a speech noise reduction method performed by a computing device. The method includes: obtaining a noisy speech signal, the noisy speech signal including a pure speech signal and a noise signal; estimating a posteriori signal-to-noise ratio and a priori signal-to-noise ratio of the noisy speech signal; determining a speech/noise likelihood ratio in a Bark domain based on the estimated posteriori signal-to-noise ratio and the estimated priori sig-
(Continued)

nal-to-noise ratio; estimating a priori speech existence probability based on the determined speech/noise likelihood ratio; determining a gain based on the estimated posteriori signal-to-noise ratio, the estimated priori signal-to-noise ratio, and the estimated priori speech existence probability, the gain being a frequency domain transfer function used for converting the noisy speech signal into an estimation of the pure speech signal; and exporting the estimation of the pure speech signal from the noisy speech signal based on the gain.

14 Claims, 10 Drawing Sheets

(51) Int. Cl.

| | |
|---|---|
| ***G10L 21/0208*** | (2013.01) |
| ***G10L 21/0232*** | (2013.01) |
| ***G10L 25/78*** | (2013.01) |
| ***G10L 25/84*** | (2013.01) |

(52) U.S. Cl.
CPC .............. *G10L 25/78* (2013.01); *G10L 25/84* (2013.01); *G10L 21/02* (2013.01)

(56) References Cited

FOREIGN PATENT DOCUMENTS

| | | | | | |
|---|---|---|---|---|---|
| CN | 103730124 A | | 4/2014 | | |
| CN | 105575406 A | * | 5/2016 | | |
| CN | 106971740 A | * | 7/2017 | ............. | G10L 21/02 |
| CN | 108428456 A | | 8/2018 | | |
| CN | 108831499 A | | 11/2018 | | |
| CN | 110164467 A | | 8/2019 | | |
| EP | 1745468 A1 | | 1/2007 | | |
| EP | 1921609 A1 | | 5/2008 | | |
| WO | WO 2007115823 A1 | | 10/2007 | | |
| WO | WO-2018086444 A1 | * | 5/2018 | ............. | G10L 21/02 |

OTHER PUBLICATIONS

Extended European Search Report, EP19898766.1, Aug. 27, 2021, 12 pgs.
Tencent Technology, ISR, PCT/CN2019/121953, Mar. 12, 2020, 2 pgs.
Tencent Technology, WO, PCT/CN2019/121953, Mar. 12, 2020, 4 pgs.
Tencent Technology, IPRP, PCT/CN2019/121953, Jun. 16, 2021, 5 pgs.

* cited by examiner

SPEECH NOISE REDUCTION METHOD AND APPARATUS, COMPUTING DEVICE, AND COMPUTER-READABLE STORAGE MEDIUM

CROSS-REFERENCE TO RELATED APPLICATIONS

This application is a continuation application of PCT Patent Application No. PCT/CN2019/121953, entitled "VOICE DENOISING METHOD AND APPARATUS, COMPUTING DEVICE AND COMPUTER READABLE STORAGE MEDIUM" filed on Nov. 29, 2019, which claims priority to Chinese Patent Application No. 201811548802.0, filed with the State Intellectual Property Office of the People's Republic of China on Dec. 18, 2018, and entitled "SPEECH NOISE REDUCTION METHOD AND APPARATUS, COMPUTING DEVICE, AND COMPUTER-READABLE STORAGE MEDIUM", all of which are incorporated herein by reference in their entirety.

FIELD OF THE TECHNOLOGY

This application relates to the field of speech processing technologies, and specifically, to a speech noise reduction method, a speech noise reduction apparatus, a computing device, and a computer-readable storage medium.

BACKGROUND OF THE DISCLOSURE

In a conventional speech noise reduction technology, there are usually two processing manners. One manner is to estimate a priori speech existence probability on each frequency point. In this case, for a recognizer, a smaller Wiener gain fluctuation in time and frequency usually indicates a higher recognition rate. If the Wiener gain fluctuation is relatively large, some musical noises are introduced instead, which may result in a low recognition rate. The other manner is to use a global priori speech existence probability. This manner is more robust in obtaining a Wiener gain than the former manner. However, only relying on priori signal-to-noise ratios on all frequency points to estimate the priori speech existence probability may not be able to well distinguish a frame containing both a speech and a noise from a frame containing only a noise.

SUMMARY

It is advantageous to provide a mechanism that can alleviate, relieve or even eliminate one or more of the foregoing problems.

According to a first aspect of this application, a computer-implemented speech noise reduction method, performed by a computing device, is provided, the method including: obtaining a noisy speech signal, the noisy speech signal including a pure speech signal and a noise signal; estimating a posteriori signal-to-noise ratio and a priori signal-to-noise ratio of the noisy speech signal; determining a speech/noise likelihood ratio in a Bark domain based on the estimated posteriori signal-to-noise ratio and the estimated priori signal-to-noise ratio; estimating a priori speech existence probability based on the determined speech/noise likelihood ratio; determining a gain based on the estimated posteriori signal-to-noise ratio, the estimated priori signal-to-noise ratio, and the estimated priori speech existence probability, the gain being a frequency domain transfer function used for converting the noisy speech signal into an estimation of the pure speech signal; and exporting the estimation of the pure speech signal from the noisy speech signal based on the gain.

According to another aspect of this application, a speech noise reduction apparatus is provided, including: a signal obtaining module, configured to obtain a noisy speech signal, the noisy speech signal including a pure speech signal and a noise signal; a signal-to-noise ratio estimation module, configured to estimate a priori signal-to-noise ratio and a posteriori signal-to-noise ratio of the noisy speech signal; a likelihood ratio determining module, configured to determine a speech/noise likelihood ratio in a Bark domain based on the estimated priori signal-to-noise ratio and the estimated posteriori signal-to-noise ratio; a probability estimation module, configured to estimate a priori speech existence probability based on the determined speech/noise likelihood ratio; a gain determining module, configured to determine a gain based on the estimated priori signal-to-noise ratio, the estimated posteriori signal-to-noise ratio, and the estimated priori speech existence probability, the gain being a frequency domain transfer function used for converting the noisy speech signal into an estimation of the pure speech signal; and a speech signal exporting module, configured to export the estimation of the pure speech signal from the noisy speech signal based on the gain.

According to still another aspect of this application, a computing device is provided, including a processor and a memory, the memory being configured to store a computer program, the computer program being configured to, when executed on the processor, cause the processor to perform the method described above.

According to yet another aspect of this application, a computer-readable storage medium is provided and configured to store a computer program, the computer program being configured to, when executed on a processor, cause the processor to perform the method described above.

According to the embodiments described below, such and other aspects of this application are clear and comprehensible, and are described with reference to the embodiments described below.

BRIEF DESCRIPTION OF THE DRAWINGS

More details, features and advantages of this application are disclosed in the following description of exemplary embodiments with reference to accompanying drawings. In the accompanying drawings.

DESCRIPTION OF EMBODIMENTS

Figure 1A:
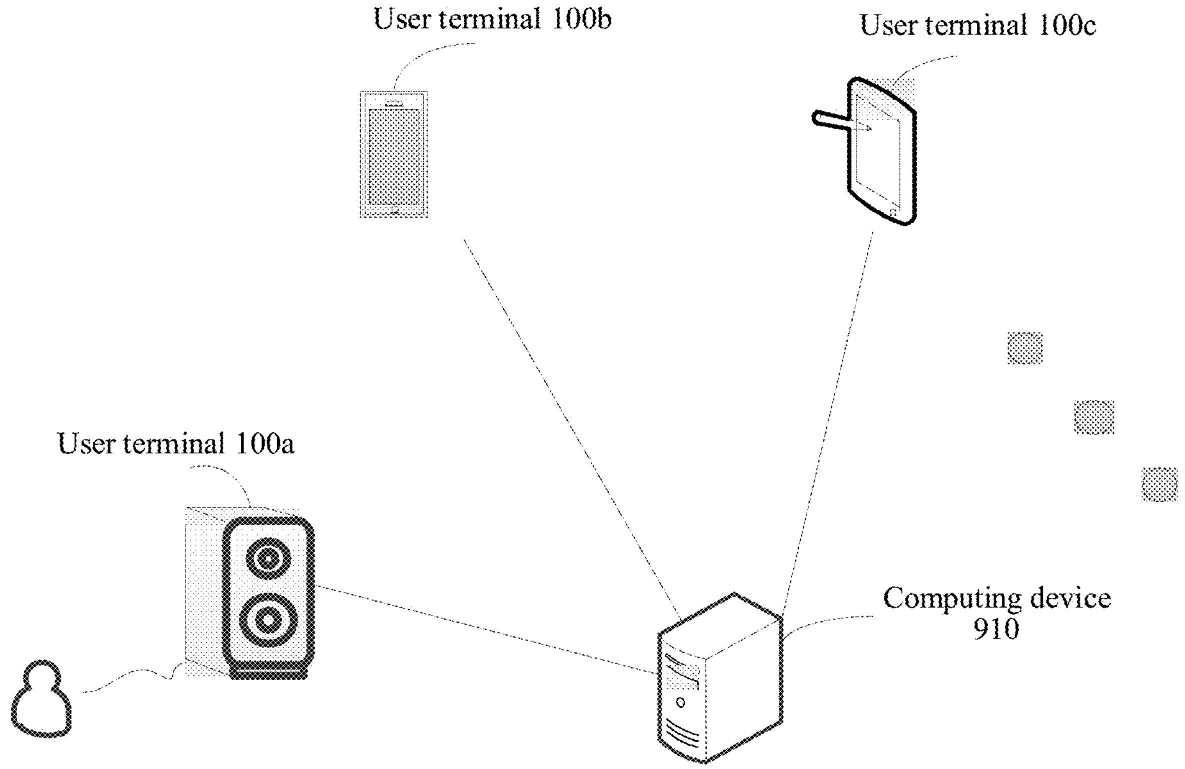
FIG. 1A is a diagram of a system architecture to which a speech noise reduction method is applicable according to an embodiment of this application.

The concept of this application is based on a signal processing theory. x(n) and d(n) are set to respectively represent a pure (that is, noise-free) speech signal and an irrelevant additive noise, and then an observation signal (referred to as a "noisy speech signal" below) may be expressed as: y(n)=x(n)+d(n). A frequency spectrum Y(k,l) is obtained by performing short-time Fourier transform on the noisy speech signal y(n), where k represents a frequency point, and l represents a sequence number of a time frame. X(k,l) is set as a frequency spectrum of the pure speech signal x(n), and then it may be obtained that a frequency spectrum of an estimated pure speech signal $\hat{x}(n)$ is $\hat{X}(k,l)=G(k,l)*Y(k,l)$ by estimating a gain G(k,l). The gain G(k,l) is a frequency domain transfer function used for converting the noisy speech signal y(n) into an estimation of the pure speech signal x(n). Then, a time domain signal of the estimated pure speech signal $\hat{x}(n)$ can be obtained by performing inverse short-time Fourier transform. Two assumptions $H_0(k,l)$ and $H_1(k,l)$ are given to respectively represent an event of speech non-existence and an event of speech existence, and then there is the following expression:

$$H_0(k,l): Y(k,l)=D(k,l)$$

$$H_1(k,l): Y(k,l)=X(k,l)+D(k,l).$$

D(k,l) represents a short-time Fourier spectrum of a noise signal. Assuming that a noisy speech signal in a frequency domain obeys Gaussian distribution:

$$p(Y(k,l)\mid H_0(k,l))=\frac{1}{\pi\lambda_d(k,l)}\exp\left\{-\frac{|Y(k,l)|^2}{\lambda_d(k,l)}\right\}$$

and $$p(Y(k,l)\mid H_1(k,l))=\frac{1}{\pi(\lambda_x(k,l)+\lambda_d(k,l))}*\exp\left\{-\frac{|Y(k,l)|^2}{\lambda_x(k,l)+\lambda_d(k,l)}\right\},$$

according to the condition probability distribution and a Bayes assumption, it may be obtained that a speech existence probability is $$p(k,l)=\left\{1+\frac{q(k,l)}{1-q(k,l)}(1+\xi(k,l))*\exp(-\upsilon(k,l))\right\}^{-1},$$

$$\text{where } \xi(k,l)=\frac{\lambda_x(k,l)}{\lambda_d(k,l)},\ \gamma(k,l)=\frac{|Y(k,l)|^2}{\lambda_d(k,l)},$$

$$\text{and } \upsilon(k,l)=\frac{\gamma(k,l)\xi(k,l)}{1+\xi(k,l)}.$$

$\lambda_x(k,l)$ is a speech variance of a $l^{th}$ frame of the noisy speech signal y(n) on a $k^{th}$ frequency point, and $\lambda_d(k,l)$ is a noise variance of the $l^{th}$ frame on the $k^{th}$ frequency point. ξ(k,l) and γ(k,l) respectively represent a priori signal-to-noise ratio and a posteriori signal-to-noise ratio of the $l^{th}$ frame on the $k^{th}$ frequency point. q(k,l) is a priori speech non-existence probability, and 1−q(k,l) is a priori speech existence probability. Log spectrum amplitude estimation is used for estimating spectrum amplitude of the pure speech signal x(n): $\hat{A}(k,l)=\exp\{E[\log A(k,l)|Y(k,l)]\}$, and a gain $G(k,l)=\{G_{H_1}(k,l)\}^{p(k,l)}G_{min}^{1-p(k,l)}$ may be obtained based on a Gaussian model assumption, where $$G_{H_1}(k,l)=\frac{\xi(k,l)}{1+\xi(k,l)}\exp\left(\frac{1}{2}\int_{\upsilon(k,l)}^{\infty}\frac{e^{-t}}{t}dt\right).$$

$G_{min}$ is an empirical value, which is used to limit the gain G(k,l) to a value not less than a threshold when no speech exists. Solving the gain G(k,l) involves estimating the priori signal-to-noise ratio ξ(k,l), the noise variance $\lambda_d(k,l)$, and the priori speech non-existence probability q(k,l).

FIG. 1A is a diagram of a system architecture to which a speech noise reduction method is applicable according to an embodiment of this application. As shown in FIG. 1A, the system architecture includes a computing device 910 and a user terminal cluster. The user terminal cluster may include a plurality of user terminals having a speech acquisition function, including a user terminal 100*a*, a user terminal 100*b*, and a user terminal 100*c*.

As shown in FIG. 1A, the user terminal 100*a*, the user terminal 100*b*, and the user terminal 100*c* may separately establish network connection to the computing device 910, and separately perform data exchange with the computing device 910 by using the network connection.

Using the user terminal 100*a* as an example, the user terminal 100*a* sends a noisy speech signal to the computing device 910 by using a network. The computing device 910 exports a pure speech signal from the noisy speech signal by using a speech noise reduction method 100 shown in FIG. 1B, or a speech noise reduction method 600 shown in FIG. 6, for a subsequent device (not shown) to perform speech recognition.

Figure 1B:
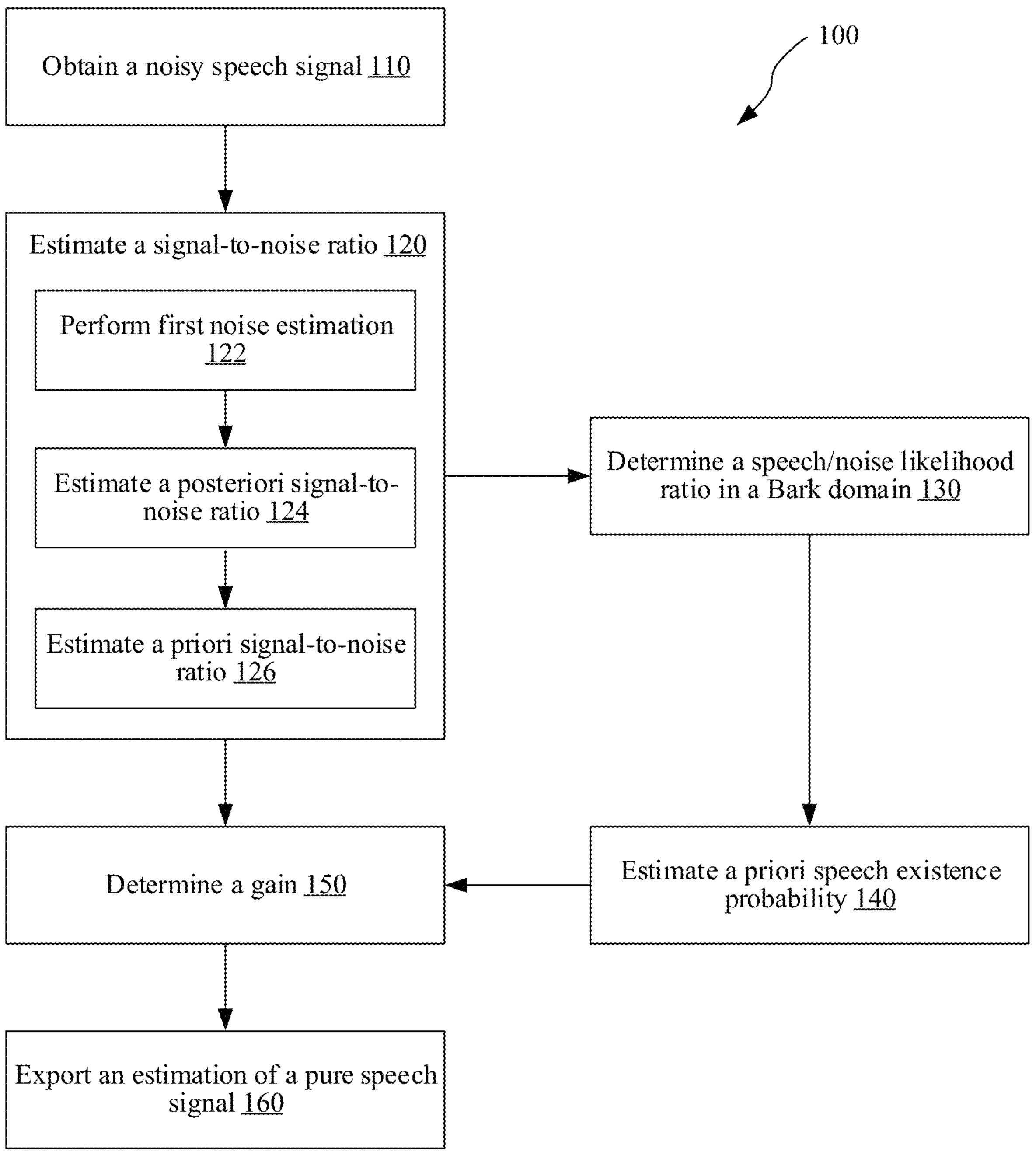
FIG. 1B is a flowchart of a speech noise reduction method according to an embodiment of this application.

FIG. 1B is a flowchart of a speech noise reduction method 100 according to an embodiment of this application. The method may be performed by the computing device 910 shown in FIG. 9.

Step 110: Obtain a noisy speech signal y(n)=x(n)+d(n) Depending on an application scenario, the obtaining of the noisy speech signal y(n) may be implemented in various different manners. In some embodiments, the noisy speech signal may be obtained directly from a speaker by using an I/O interface such as a microphone. In some embodiments, the noisy speech signal may be received from a remote device by using a wired or wireless network or a mobile telecommunication network. In some embodiments, the noisy speech signal may alternatively be retrieved from a speech data record buffered or stored in a local memory. The obtained noisy speech signal y(n) is transformed into a frequency spectrum Y(k,l) by performing short-time Fourier transform for processing.

Step 120: Estimate a posteriori signal-to-noise ratio γ(k,l) and a priori signal-to-noise ratio ξ(k,l) of the noisy speech signal y(n). In this embodiment, the estimation may be implemented through the following step 122 to step 126.

Figure 2:
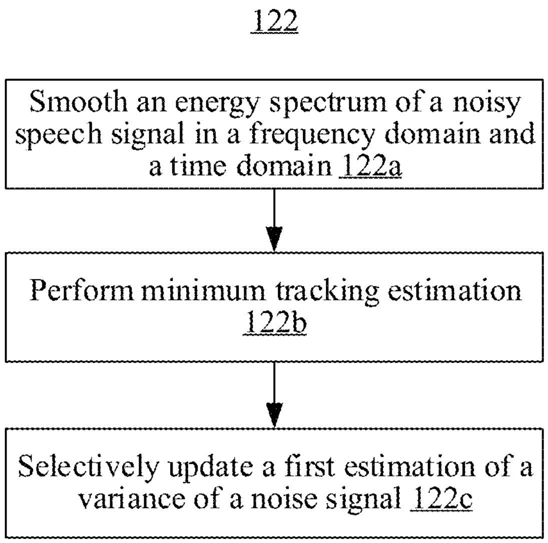
FIG. 2 shows in more details a step of performing first noise estimation in the method of FIG. 1B.

Step 122: Perform first noise estimation to obtain a first estimation of a variance $\lambda_d(k,l)$ of the noise signal. FIG. 2 shows in more details how the first noise estimation is performed.

Referring to FIG. 2, step 122*a*: smooth an energy spectrum of the noisy speech signal y(n) in a frequency domain:

$$S_f(k,l)=\sum_{i=-w}^{w} W(i)|Y(k-i,l)|^2,$$

where W(i) is a window having a length of 2*w+1. Then, time domain smoothing is performed on $S_f(k,l)$ to obtain $S(k,l)=\alpha_s S(k,l-1)+(1-\alpha_s)S_f(k,l)$, where $\alpha_s$ is a smoothing factor. Step 122*b*: Perform minimum tracking estimation on the smoothed energy spectrum S(k,l). Specifically, the minimum tracking estimation is performed as follows:

$$S_{min}(k,l)=\min\{S_{min}(k,l-1),S(k,l)\}$$

$$S_{tmp}(k,l)=\min\{S_{tmp}(k,l-1),S(k,l)\}$$

where initial values of $S_{min}$ and $S_{tmp}$ are S (k,0). After L frames, an expression of the minimum tracking estimation is updated to $$S_{min}(k,l)=\min\{S_{tmp}(k,l-1),S(k,l)\}$$

$$S_{tmp}(k,l)=S(k,l)$$

in an $(L+1)^{th}$ frame. Then, for L frames from an $(L+2)^{th}$ frame to a $(2L+1)^{th}$ frame, the expression of the minimum tracking estimation is restored to $$S_{min}(k,l)=\min\{S_{min}(k,l-1),S(k,l)\}$$

$$S_{tmp}(k,l)=\min\{S_{tmp}(k,l-1),S(k,l)\}.$$

In a $(2(L+1))^{th}$ frame, the expression of the minimum $$S_{min}(k,l)=\min\{S_{tmp}(k,l-1),S(k,l)\}$$

tracking estimation is updated to $$S_{tmp}(k,l)S(k,l)$$

again. Then, for subsequent L frames, the expression of the minimum tracking estimation is restored to $$S_{min}(k,l)=\min\{S_{min}(k,l-1),S(k,l)\}$$

$$S_{tmp}(k,l)=\min\{S_{tmp}(k,l-1),S(k,l)\}$$

again, and the rest can be deduced by analogy. That is, the expression of the minimum tracking estimation is periodically updated with a period of the L+1 frames. Step 122*c*: Selectively update the first estimation of the variance $\lambda_d(k,l)$ of the noise signal in a current frame depending on a ratio of the smoothed energy spectrum S(k,l) to the minimum tracking estimation $S_{min}(k,l)$ of the smoothed energy spectrum, that is, $$S_r(k,l)=\frac{S(k,l)}{S_{min}(k,l)},$$

and by using the first estimation of the variance $\lambda_d(k,l-1)$ of the noise signal in a previous frame of the noisy speech signal y(n) and the energy spectrum $Y|(k,l)|^2$ of the current frame of the noisy speech signal y(n). Specifically, when the ratio $S_r(k,l)$ is greater than or equal to a first threshold, update is performed, and when the ratio $S_r(k,l)$ is less than the first threshold, no update is performed. The noise estimation update formula is: $\hat{\lambda}_d(k,l)=\alpha_d\hat{\lambda}_d(k,l-1)+(1-\alpha_d)|Y(k,l)|^2$, where $\alpha_d$ is a smoothing factor. In engineering practice, several initial frames of the obtained noisy speech signal y(n) may be estimated as an initial value of the noise signal.

Referring to FIG. 1B again, step 124: Estimate the posteriori signal-to-noise ratio $\gamma(k,l)$ by using the first estimation of the variance $\lambda_d(k,l)$ of the noise signal. After the estimated variance $\hat{\lambda}_d(k,l)$ of the noise signal is obtained in step 122, an estimation of the posteriori signal-to-noise ratio $\gamma(k,l)$ may be calculated as $$\hat{\gamma}(k,l)=\frac{|Y(k,l)|^2}{\hat{\lambda}_d(k,l)}.$$

Step 126: Estimate the priori signal-to-noise ratio $\xi(k,l)$ by using the estimated posteriori signal-to-noise ratio $\hat{\gamma}(k,l)$. In this embodiment, the priori signal-to-noise ratio estimation may use decision-directed (DD) estimation:

$$\hat{\xi}(k,l)=\alpha G_{H_1}{}^2(k,l-1)\hat{\gamma}(k,l-1)+(1-\alpha)\max\{\hat{\gamma}(k,l)-1,0\},$$

$G_{H_1}{}^2(k,l-1)\hat{\gamma}(k,l-1)$ represents an estimation of a priori signal-to-noise ratio of a previous frame, max $\{\gamma(k,l)-1,0\}$ is a maximum likelihood estimation of a priori signal-to-noise ratio based on a current frame, and $\alpha$ is a smoothing factor of the two estimations. Therefore, the estimated priori signal-to-noise ratio $\hat{\xi}(k,l)$ is obtained.

Step 130: Determine a speech/noise likelihood ratio in a Bark domain based on the estimated posteriori signal-to-noise ratio $\hat{\gamma}(k,l)$ and the estimated priori signal-to-noise ratio $\hat{\xi}(k,l)$. A formula of the likelihood ratio is $$\Delta(k,l)=\frac{P(Y(k,l)\mid H_1(k,l))}{P(Y(k,l)\mid H_0(k,l)}.$$

Figure 3:
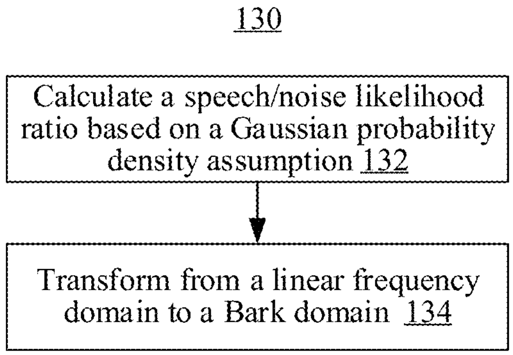
FIG. 3 shows in more details a step of determining a speech/noise likelihood ratio in the method of FIG. 1B.

Y(k,l) is an amplitude spectrum of a $l^{th}$ frame on a $k^{th}$ frequency point. $H_1(k,l)$ is a state that the $l^{th}$ frame is assumed to be a speech on the $k^{th}$ frequency point. $H_0(k,l)$ is a state that the $l^{th}$ frame is assumed to be a noise on the $k^{th}$ frequency point. $P(Y(k,l)|H_1(k,l))$ is a probability density when speech exists, and $P(Y(k,l)|H_0(k,l))$ is a probability density when noise exists. FIG. 3 shows in more details how the speech/noise likelihood ratio is determined.

Referring to FIG. 3, step 132: Perform Gaussian probability density function (PDF) assumption on the probability density, and the formula of the likelihood ratio may become:

$$\Delta(k,l)=\frac{P(Y(k,l)\mid H_1(k,l))}{P(Y(k,l)\mid H_0(k,l))}=\frac{\exp\left(\frac{\xi(k,l)\gamma(k,l)}{(1+\xi(k,l))}\right)}{(1+\xi(k,l))}.$$

Step 134: Transform the priori signal-to-noise ratio $\xi(k,l)$ and the posteriori signal-to-noise ratio $\gamma(k,l)$ from a linear frequency domain to a Bark domain. The Bark domain is 24 critical frequency bands of hearing simulated by using an auditory filter, and therefore has 24 frequency points. There are a plurality of manners to transform from the linear frequency domain to the Bark domain. In this embodiment, the transformation may be based on the following equation:

$$b=13*\arctan(0.76*f_{kHz})+3.5*\arctan\left(\frac{f_{kHz}}{7.5}\right)^2,$$

where $f_{kHz}$ is a frequency in the linear frequency domain, and b represents the 24 frequency points in the Bark domain. Therefore, the formula of the likelihood ratio on the Bark domain may be expressed as $$\Delta(b,l)=\frac{\exp\left(\frac{\xi(b,l)\gamma(b,l)}{(1+\xi(b,l))}\right)}{(1+\xi(b,l))}.$$

Figure 4:
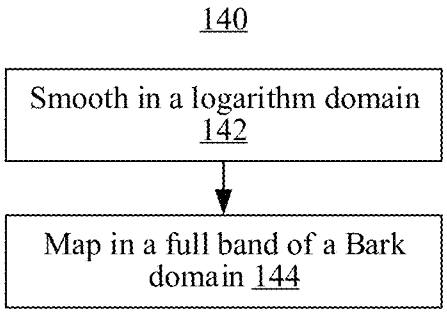
FIG. 4 shows in more details a step of estimating a priori speech existence probability in the method of FIG. 1B.

Referring to FIG. 1B again, step 140: estimate a priori speech existence probability based on the determined speech/noise likelihood ratio. The method shown in FIG. 1B can improve the accuracy of determining whether a speech appears, and avoid repeatedly determining whether the speech appears, thereby improving the resource utilization. FIG. 4 shows in more details how the priori speech existence probability is estimated.

Referring to FIG. 4, step 142: smooth Δ(b, l) to log(Δ(b, l))=β*log (Δ(b, l−1))+(1−β)*log(Δ(b, l)) in a logarithm domain, where β is a smoothing factor. Step 144: Obtain the estimated priori speech existence probability $P_{frame}$ (l) by mapping log(Δ(b, l) in a full band of the Bark domain. In this embodiment, a function tanh may be used for mapping to obtain $$P_{frame}(l)=\tanh\left(\frac{1}{24}\sum_{b=1}^{24}\log(\Delta(b,l))\right).\ P_{frame}(l)$$

is the estimated priori speech existence probability, that is, the estimation of the priori speech existence probability 1−q(k,l) mentioned in the opening paragraph of DESCRIPTION OF EMBODIMENTS. In this embodiment, the function tanh is used because the function tanh can map an interval [0,+∞) to an interval of 0-1, although other embodiments are possible.

Compared with a speech noise reduction solution of a related art, the method 100 can improve the accuracy of determining whether a speech appears. This is because (1) the speech/noise likelihood ratio can well distinguish a state that a speech appears from a state that no speech appears, and (2) compared with the linear frequency domain, the Bark domain is more consistent with the auditory masking effect of a human ear. The Bark domain can amplify a low frequency and compress a high frequency, which can more clearly reveal which signal is easy to produce masking and which noise is relatively obvious. Therefore, the method 100 can improve the accuracy of determining whether a speech appears, thereby obtaining a more accurate priori speech existence probability.

Referring to FIG. 1B again, step 150: Determine a gain G(k,l) based on the estimated posteriori signal-to-noise ratio $\hat{\gamma}$(k, l) obtained in step 124, the estimated priori signal-to-noise ratio $\hat{\xi}$(k, l) obtained in step 126, and the estimated priori speech existence probability $P_{frame}$(l) obtained in step 140. This may be implemented by using the following equation mentioned in the opening paragraph of DESCRIPTION OF EMBODIMENTS:

$$G(k,l)=\{G_{H_1}(k,l)\}^{p(k,l)}G_{min}^{1-p(k,l)},$$

-continued $$\text{where } G_{H_1}(k,l)=\frac{\xi(k,l)}{1+\xi(k,l)}\exp\left(\frac{1}{2}\int_{\upsilon(k,l)}^{\infty}\frac{e^{-t}}{t}dt\right),$$

$$\text{and } p(k,l)=\left\{1+\frac{q(k,l)}{1-q(k,l)}(1+\xi(k,l))*\exp(-\upsilon(k,l))\right\}^{-1},$$

$$\text{where } \upsilon(k,l)=\frac{\gamma(k,l)\xi(k,l)}{1+\xi(k,l)}.$$

Step 160: Export the estimation x̂(n) of the pure speech signal x(n) from the noisy speech signal y(n) based on the gain G(k,l). Specifically, a frequency spectrum of the estimated pure speech signal x̂(n) can be obtained by X̂(k,l)=G (k,l)*Y(k,l), and then a time domain signal of the estimated pure speech signal x̂(n) can be obtained by performing inverse short-time Fourier transform.

Figure 5A:
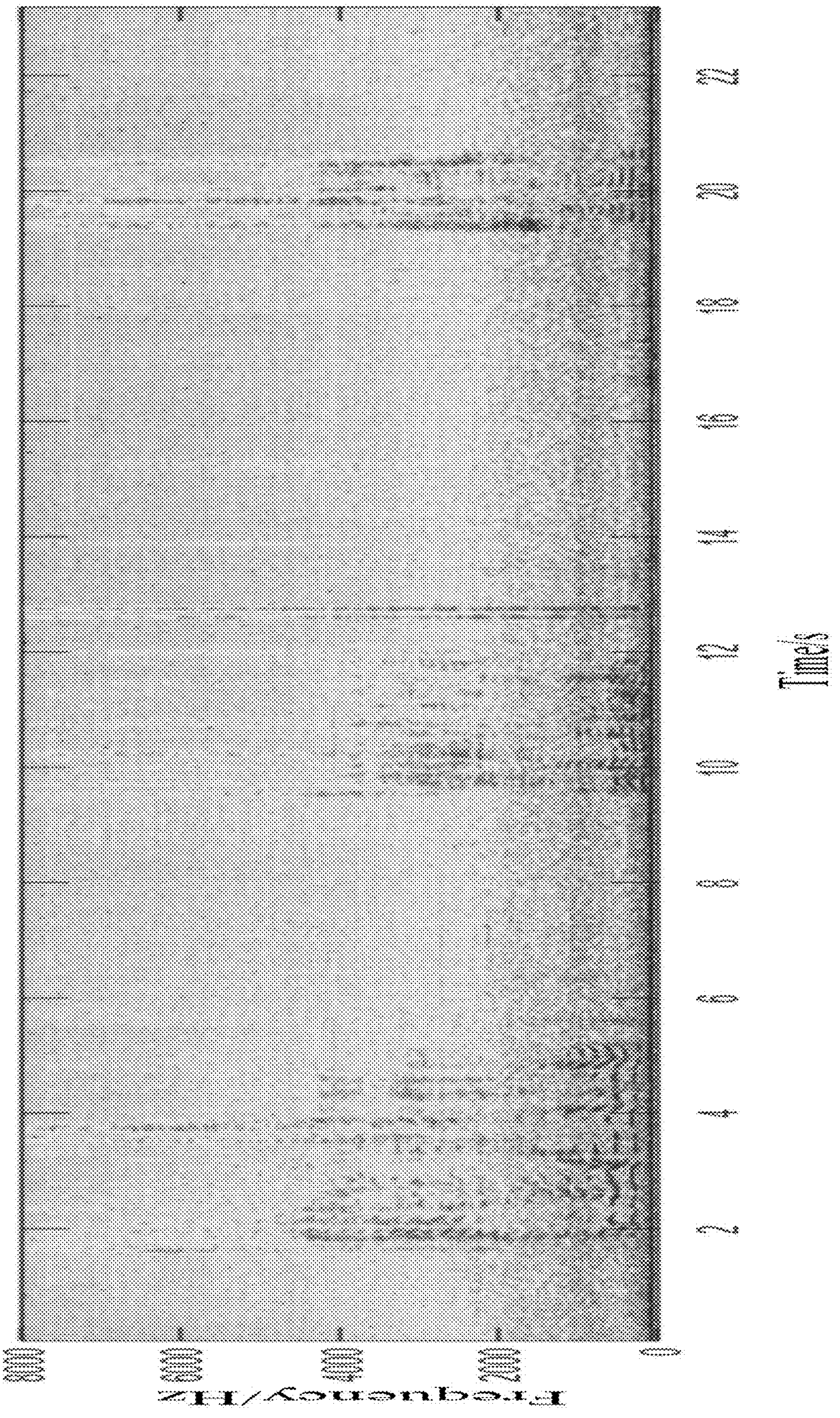
FIG. 5A, FIG. 5B, and FIG. 5C respectively show corresponding spectrograms of an exemplary original noisy speech signal, an estimation of a pure speech signal exported from the original noisy speech signal by using a related art, and an estimation of a pure speech signal exported from the original noisy speech signal by using the method of FIG. 1B.
Figure 5B:
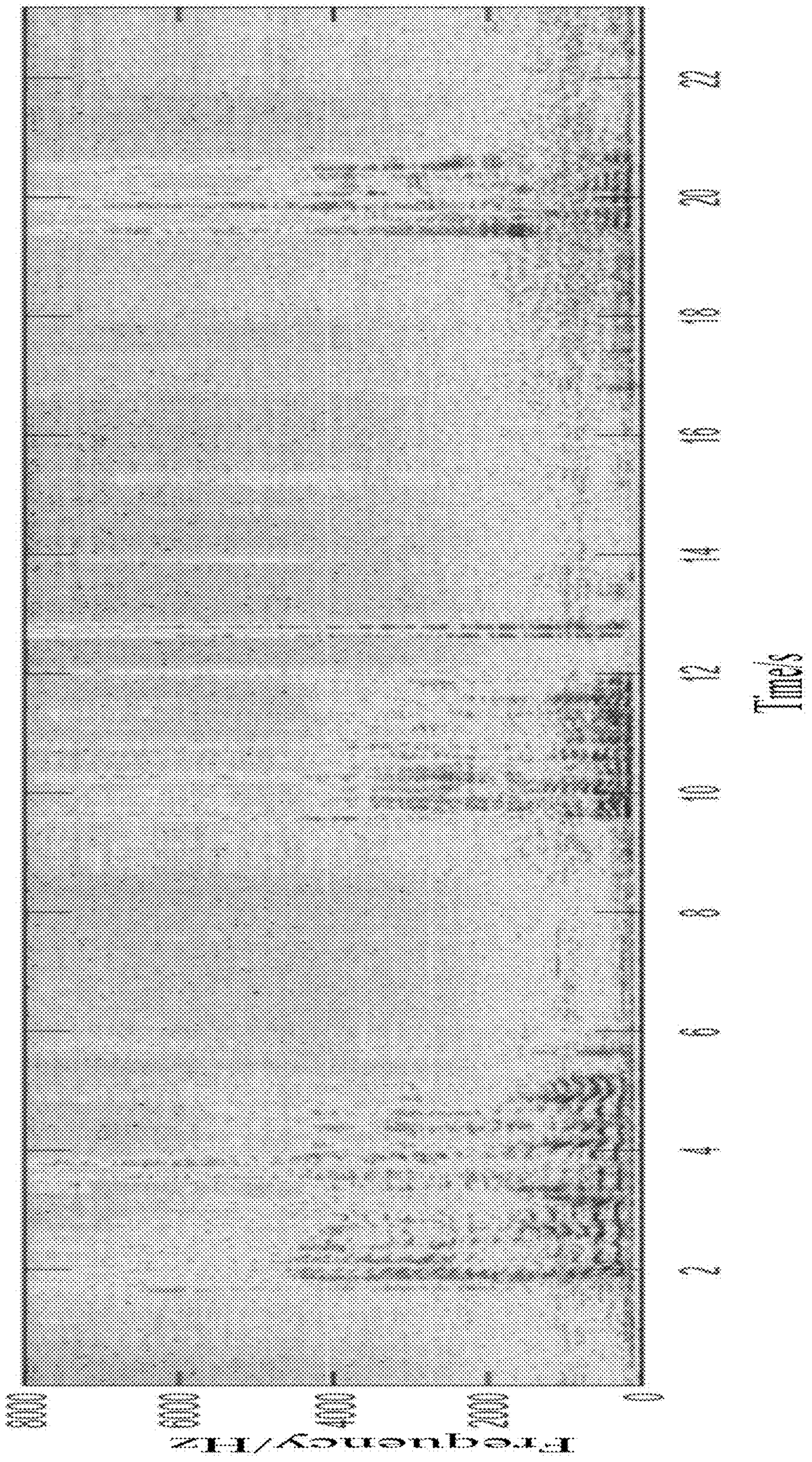
Figure 5C:
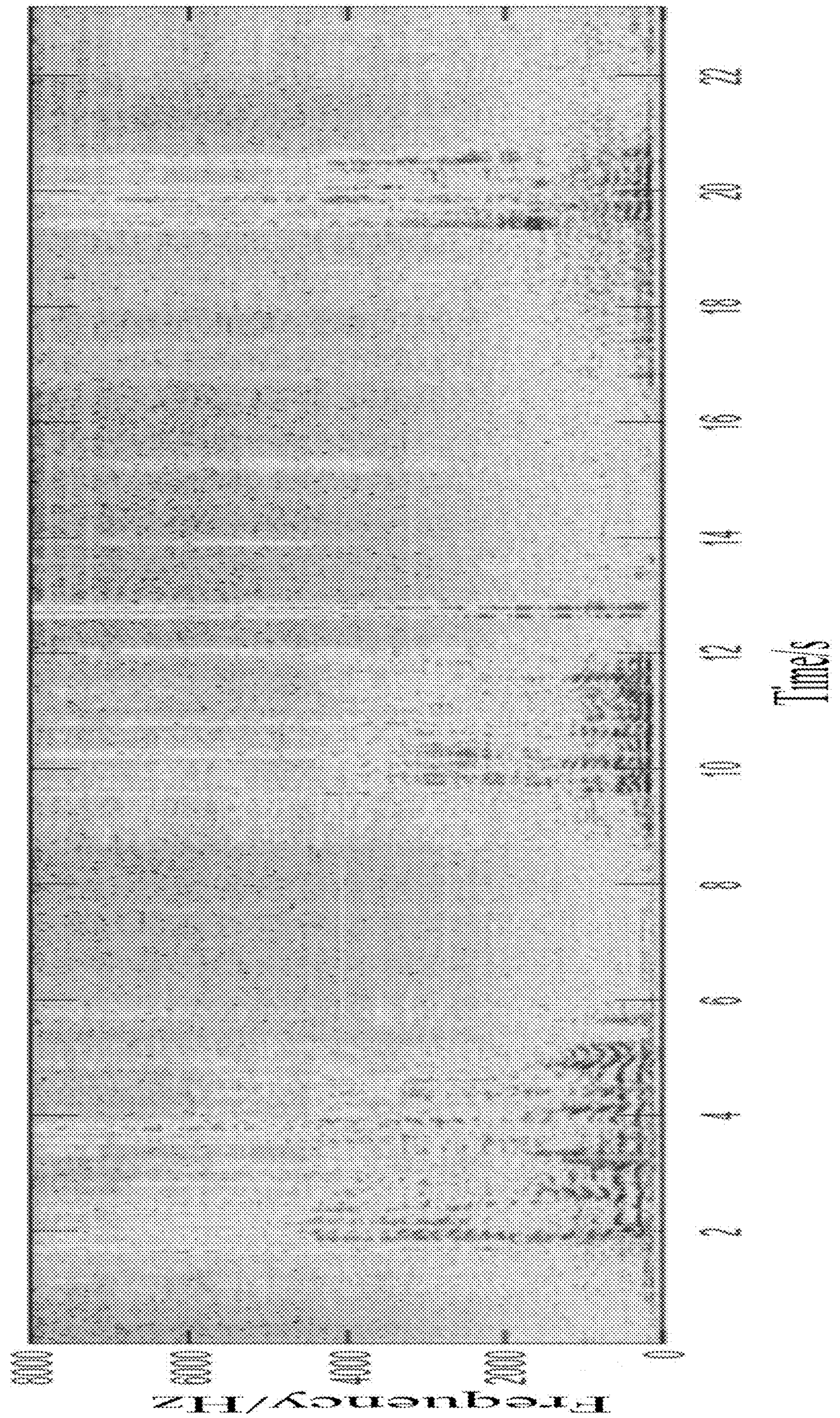

FIG. 5A, FIG. 5B, and FIG. 5C respectively show corresponding spectrograms of an exemplary original noisy speech signal, an estimation of a pure speech signal exported from the original noisy speech signal by using a related art, and an estimation of a pure speech signal exported from the original noisy speech signal by using the method 100. As can be seen from these figures, when only a noise exists, compared with FIG. 5B, the noise is further suppressed in FIG. 5C, while a speech is basically unchanged. This indicates that the method 100 performs better in estimating whether a speech exists, and further suppresses a noise when only the noise exists. This advantageously enhances the quality of a speech signal recovered from a noisy speech signal.

Figure 6:
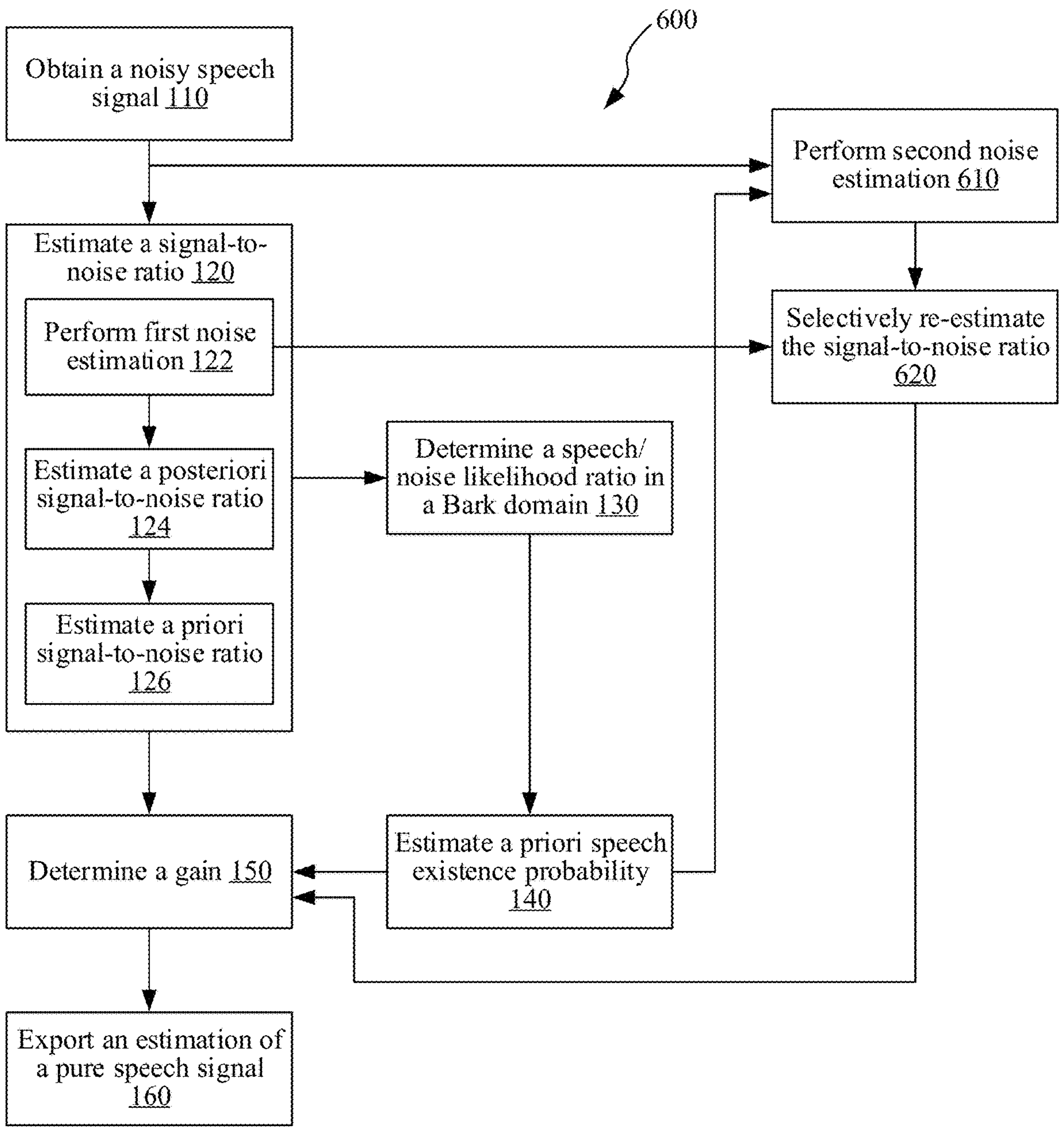
FIG. 6 is a flowchart of a speech noise reduction method according to another embodiment of this application.

FIG. 6 is a flowchart of a speech noise reduction method 600 according to another embodiment of this application. The method may be performed by the computing device 910 shown in FIG. 9.

Referring to FIG. 6, similar to the method 100, the method 600 also includes step 110 to step 160, and details of the steps have been described above with reference to FIG. 1B to FIG. 4 and are therefore omitted herein. Different from the method 100, the method 600 further includes step 610 and step 620, which are described in detail below.

Step 610: Perform second noise estimation to obtain a second estimation of the variance $\lambda_d$(k,l) of the noise signal. The second noise estimation is performed independently of (in parallel with) the first noise estimation, and may use the same noise estimation update formula $\hat{\lambda}$d(k,l)=$\alpha_d\hat{\lambda}$d(k,l−1)+(1−$\alpha_d$)|Y(k,l)|$^2$ as that in step 122. However, in the second noise estimation, an update criterion different from that of the first noise estimation is used. Specifically, in step 610, the second estimation of the variance $\lambda_d$(k,l) of the noise signal in a current frame is selectively updated depending on the estimated priori speech existence probability $P_{frame}$(l) obtained in step 140, and by using the second estimation of the variance $\lambda_d$(k,l−1) of the noise signal in a previous frame of the noisy speech signal y(n) and an energy spectrum Y|(k,l)|$^2$ of the current frame of the noisy speech signal y(n). More specifically, if the estimated priori speech existence probability $P_{frame}$(l) is greater than or equal to a second threshold spthr, the update is performed, and if the estimated priori speech existence probability $P_{frame}$(l) is less than the second threshold spthr, the update is not performed.

Step 620: Selectively re-estimate the posteriori signal-to-noise ratio γ(k,l) and the priori signal-to-noise ratio ξ(k,l) depending on a sum of magnitudes of the first estimation of the variance $\lambda_d$(k,l) of the noise signal in a predetermined frequency range, and by using the second estimation of the variance $\lambda_d(k,l)$ of the noise signal. In some embodiments, the predetermined frequency range may be, for example, a low frequency range, such as 0 to 1 kHz, although other embodiments are possible. The sum of the magnitudes of the first estimation of the variance $\lambda_d(k,l)$ of the noise signal in the predetermined frequency range may indicate a level of a predetermined frequency component of the noise signal. In this embodiment, if the sum of the magnitudes is greater than or equal to a third threshold noithr, the re-estimation is performed, and if the sum of the magnitudes is less than the third threshold noithr, the re-estimation is not performed. The re-estimation of the posteriori signal-to-noise ratio $\gamma(k,l)$ and the priori signal-to-noise ratio $\xi(k,l)$ may be based on the operations in step 124 and step 126 described above, but the estimation of the noise variance obtained in the second noise estimation of step 610 (rather than in the first noise estimation of step 122) is used.

In a case that the re-estimation is performed, a gain G(k,l) is determined, in step 150, based on the re-estimated posteriori signal-to-noise ratio (rather than the posteriori signal-to-noise ratio obtained in step 124), the re-estimated priori signal-to-noise ratio (rather than the priori signal-to-noise ratio obtained in step 126), and the estimated priori speech existence probability obtained in step 140. In a case that the re-estimation is not performed, the gain G(k,l) is determined, in step 150, still based on the posteriori signal-to-noise ratio obtained in step 124, the priori signal-to-noise ratio obtained in step 126, and the estimated priori speech existence probability obtained in step 140.

Compared with a solution that directly uses the second noise estimation to re-estimate the priori signal-to-noise ratio $\xi(k,l)$ and the posteriori signal-to-noise ratio $\gamma(k,l)$ (and therefore a Wiener gain G(k,l)), the method 600 is able to improve a recognition rate in a case of a low signal-to-noise ratio, because the second noise estimation may result in overestimation of a noise. The overestimation can further suppress the noise in the case of the low signal-to-noise ratio, but speech information may be lost in a case of a high signal-to-noise ratio. Because decision of the noise estimation is introduced, and the first noise estimation or the second noise estimation is selectively used, according to a decision result, to calculate the Wiener gain, the method 600 can ensure a good performance in both the case of the high signal-to-noise ratio and the case of the low signal-to-noise ratio.

Figure 7:
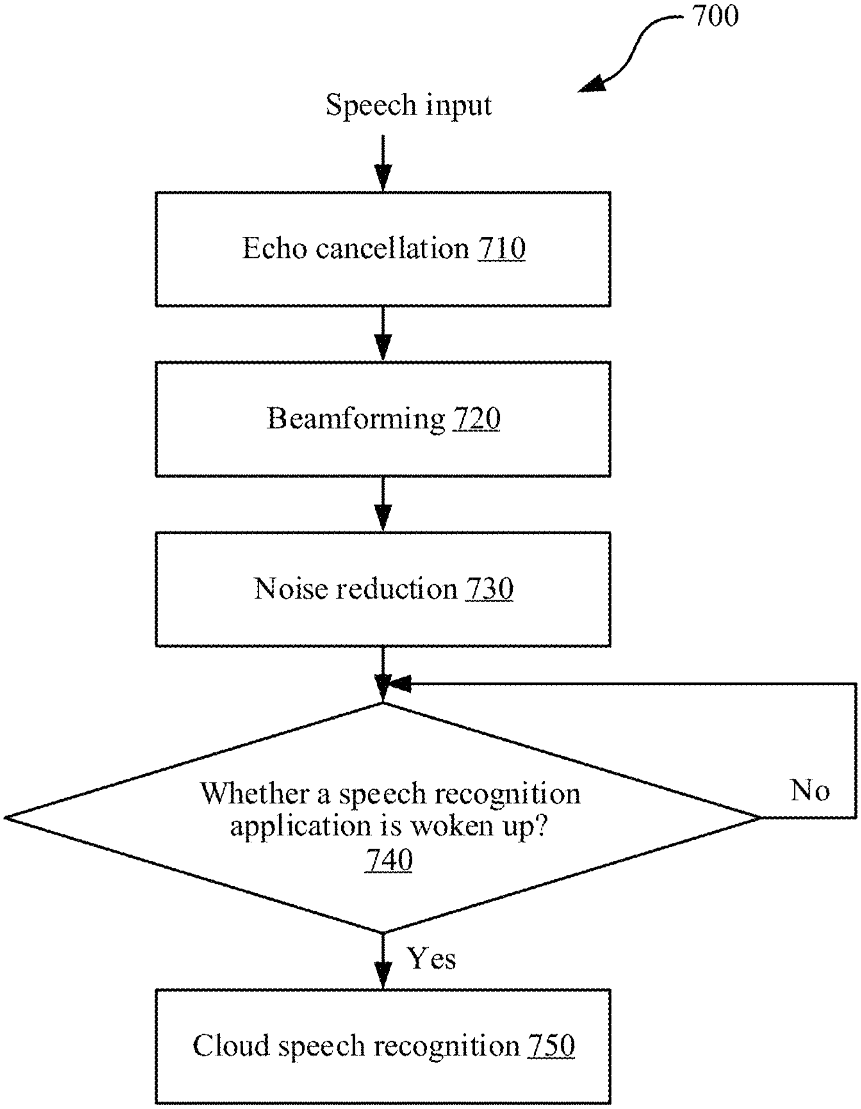
FIG. 7 shows an exemplary processing procedure in a typical application scenario to which the method of FIG. 6 is applicable.

FIG. 7 shows an exemplary processing procedure 700 in a typical application scenario to which the method 600 of FIG. 6 is applicable. The typical application scenario is, for example, a human-machine conversation between an in-vehicle terminal and a user. At 710, echo cancellation is performed on a speech input from the user. The speech input may be, for example, a noisy speech signal acquired by using a plurality of signal acquisition channels. The echo cancellation may be implemented based on, for example, an automatic echo cancellation (AEC) technology. At 720, beamforming is performed. A required speech signal is formed by performing weighted combination on the signals acquired by using the plurality of signal acquisition channels. At 730, noise reduction is performed on the speech signal. This can be implemented by using the method 600 of FIG. 6. At 740, whether to wake up a speech application program installed on the in-vehicle terminal is determined based on the denoised speech signal. For example, only when the denoised speech signal is recognized as a specific speech password (for example, "Hello! XXX"), the speech application program is woken up. The speech password can be recognized by using local speech recognition software on the in-vehicle terminal. If the speech application program is not woken up, the speech signal is continually received and recognized until the required speech password is inputted. If the speech application program is woken up, a cloud speech recognition function is triggered at 750, and the denoised speech signal is sent by the in-vehicle terminal to the cloud for recognition. After recognizing the speech signal from the in-vehicle terminal, the cloud can send corresponding speech response content back to the in-vehicle terminal, thereby implementing the human-machine conversation. In an implementation, the speech signal may be recognized and responded to locally in the in-vehicle terminal.

Figure 8:
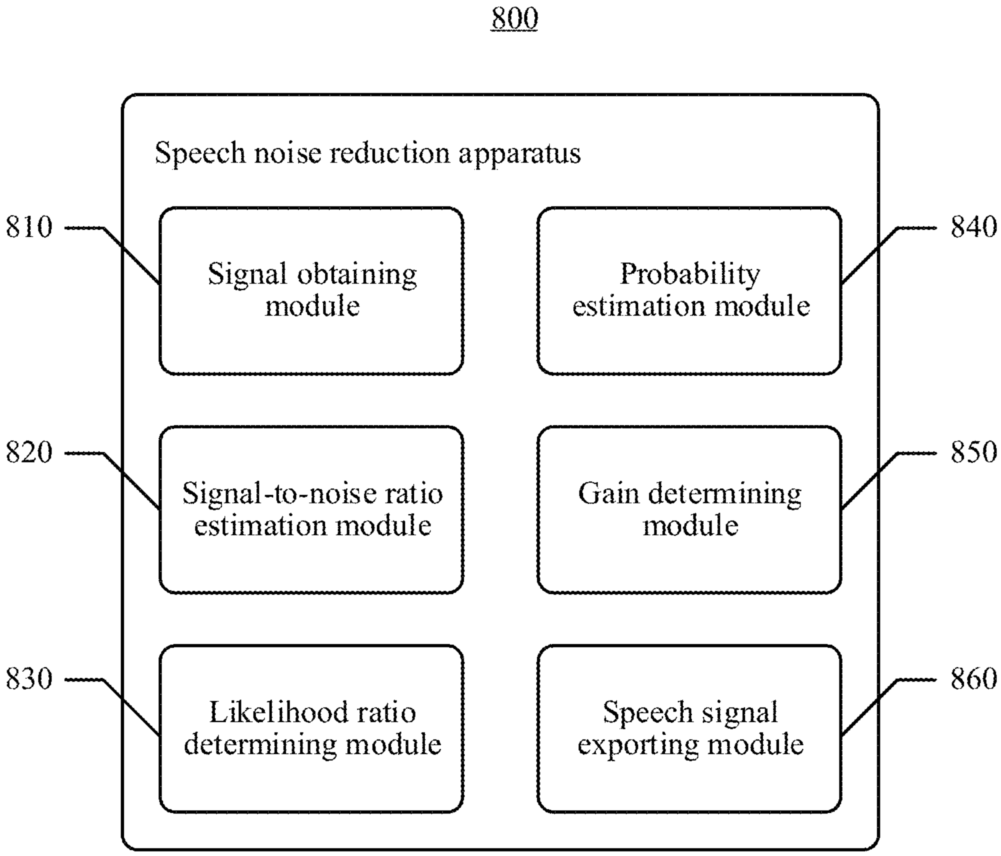
FIG. 8 is a block diagram of a speech noise reduction apparatus according to an embodiment of this application.

FIG. 8 is a block diagram of a speech noise reduction apparatus 800 according to an embodiment of this application. Referring to FIG. 8, the speech noise reduction apparatus 800 includes a signal obtaining module 810, a signal-to-noise ratio estimation module 820, a likelihood ratio determining module 830, a probability estimation module 840, a gain determining module 850, and a speech signal exporting module 860.

The signal obtaining module 810 is configured to obtain a noisy speech signal) y(n). Depending on an application scenario, the signal obtaining module 810 may be implemented in various different manners. In some embodiments, the signal obtaining module may be a speech pickup device such as a microphone or another hardware implemented receiver. In some embodiments, the signal obtaining module may be implemented as a computer instruction to retrieve a speech data record, for example, from a local memory. In some embodiments, the signal obtaining module may be implemented as a combination of hardware and software. The obtaining of the noisy speech signal y(n) involves the operation in step 110 described above with reference to FIG. 1B. Details are not described herein again.

The signal-to-noise ratio estimation module 820 is configured to estimate a posteriori signal-to-noise ratio $\gamma(k,l)$ and a priori signal-to-noise ratio $\xi(k,l)$ of the noisy speech signal y(n). This involves the operations in step 120 described above with reference to FIG. 1B and FIG. 2. Details are not described herein again. In some embodiments, the signal-to-noise ratio estimation module 820 may be further configured to perform the operations in step 610 and step 620 described above with reference to FIG. 6. Specifically, the signal-to-noise ratio estimation module 820 may be further configured to (1) perform second noise estimation, to obtain a second estimation of the variance $\lambda_d(k,l)$ of the noise signal, and (2) selectively re-estimate the posteriori signal-to-noise ratio $\gamma(k,l)$ and the priori signal-to-noise ratio $\xi(k,l)$ depending on a sum of magnitudes of the first estimation of the variance $\lambda_d(k,l)$ of the noise signal in a predetermined frequency range, and by using the second estimation of the variance $\lambda_d(k,l)$ of the noise signal.

The likelihood ratio determining module 830 is configured to determine a speech/noise likelihood ratio in a Bark domain based on the estimated posteriori signal-to-noise ratio $\hat{\gamma}(k, l)$ and the estimated priori signal-to-noise ratio $\hat{\xi}(k, l)$. This involves the operations in step 130 described above with reference to FIG. 1B and FIG. 3. Details are not described herein again.

The probability estimation module 840 is configured to estimate a priori speech existence probability based on the determined speech/noise likelihood ratio. This involves the operations in step 140 described above with reference to FIG. 1B and FIG. 4. Details are not described herein again.

The gain determining module 850 is configured to determine a gain G(k,l) based on the estimated posteriori signal-to-noise ratio $\hat{\gamma}(k, l)$, the estimated priori signal-to-noise ratio $\hat{\xi}(k, l)$, and the estimated priori speech existence probability $P_{frame}(l)$. This involves the operation in step 150 described above with reference to FIG. 1B. Details are not described herein again. In an embodiment in which the posteriori signal-to-noise ratio and the priori signal-to-noise ratio have been re-estimated by using the signal-to-noise ratio estimation module 820, the gain determining module 850 is further configured to determine a gain G(k,l) based on the re-estimated posteriori signal-to-noise ratio, the re-estimated priori signal-to-noise ratio, and the estimated priori speech existence probability $P_{frame}(l)$.

The speech signal exporting module 860 is configured to export an estimation $\hat{x}(n)$ of a pure speech signal x(n) from the noisy speech signal y(n) based on the gain G(k,l). This involves the operation in step 160 described above with reference to FIG. 1B. Details are not described herein again.

Figure 9:
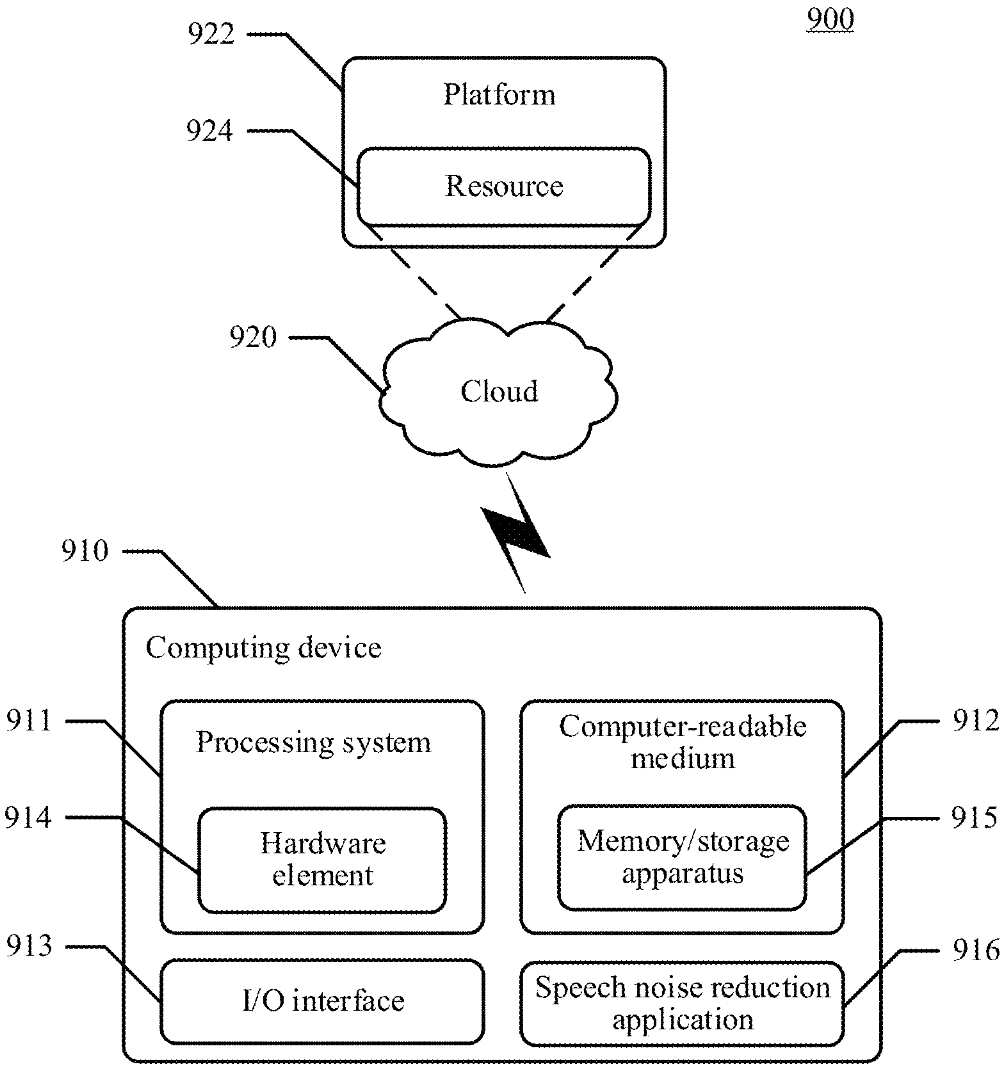
FIG. 9 is a structural diagram of an exemplary system according to an embodiment of this application, where the exemplary system includes an exemplary computing device of one or more systems and/or devices that can implement various technologies described herein.

FIG. 9 is a structural diagram of an exemplary system 900 according to an embodiment of this application. The system 900 includes an exemplary computing device 910 of one or more systems and/or devices that can implement various technologies described herein. The computing device 910 may be, for example, a server device of a service provider, a device associated with a client (for example, a client device), a system-on-a-chip, and/or any other suitable computing device or computing system. The speech noise reduction apparatus 800 described above with reference to FIG. 8 may be in the form of the computing device 910. In an implementation, the speech noise reduction apparatus 800 may be implemented as a computer program in the form of a speech noise reduction application 916.

The exemplary computing device 910 shown in the figure includes a processing system 911, one or more computer-readable media 912, and one or more I/O interfaces 913 that are communicatively coupled to each other. Although not shown, the computing device 910 may further include a system bus or another data and command transfer system, which couples various components to each other. The system bus may include any one or a combination of different bus structures. The bus structure is, for example, a memory bus or a memory controller, a peripheral bus, a universal serial bus, and/or a processor or a local bus that uses any one of various bus architectures. Various other examples are also conceived, such as control and data lines.

The processing system 911 represents a function to perform one or more operations by using hardware. Therefore, the processing system 911 is shown to include a hardware element 914 that can be configured as a processor, a functional block, and the like. This may include implementation, in the hardware, as an application-specific integrated circuit or another logic device formed by using one or more semiconductors. The hardware element 914 is not limited by a material from which the hardware element is formed or a processing mechanism used therein. For example, the processor may be formed by (a plurality of) semiconductors and/or transistors (such as an electronic integrated circuit (IC)). In such a context, a processor-executable instruction may be an electronically-executable instruction.

The computer-readable medium 912 is shown to include a memory/storage apparatus 915. The memory/storage apparatus 915 represents a memory/storage capacity associated with one or more computer-readable media. The memory/storage apparatus 915 may include a volatile medium (such as a random-access memory (RAM)) and/or a non-volatile medium (such as a read-only memory (ROM), a flash memory, an optical disc, and a magnetic disk). The memory/storage apparatus 915 may include a fixed medium (such as a RAM, a ROM, and a fixed hard disk drive) and a removable medium (such as a flash memory, a removable hard disk drive, and an optical disc). The computer-readable medium 912 may be configured in various other manners further described below.

The one or more I/O interfaces 913 represent functions to allow a user to input a command and information to the computing device 910, and also allow information to be presented to the user and/or another component or device by using various input/output devices. An exemplary input device includes a keyboard, a cursor control device (such as a mouse), a microphone (for example, for speech input), a scanner, a touch function (such as a capacitive sensor or another sensor configured to detect a physical touch), a camera (for example, which may detect a motion that does not involve a touch as a gesture by using a visible or an invisible wavelength (such as an infrared frequency), and the like. An exemplary output device includes a display device (such as a monitor or a projector), a speaker, a printer, a network interface card, a tactile response device, and the like. Therefore, the computing device 910 may be configured in various manners further described below to support user interaction.

The computing device 910 further includes the speech noise reduction application 916. The speech noise reduction application 916 may be, for example, a software instance of the speech noise reduction apparatus 800 of FIG. 8, and implement the technologies described herein in combination with other elements in the computing device 910.

Various technologies may be described herein in a general context of software, hardware elements or program modules. Generally, such modules include a routine, a program, an object, an element, a component, a data structure, and the like for executing a particular task or implementing a particular abstract data type. The terms “module”, “function” and “component” used herein generally represent a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

Implementations of the described modules and technologies may be stored on or transmitted across a particular form of a non-transitory computer-readable medium. The computer-readable medium may include various media that can be accessed by the computing device 910. By way of example, and not limitation, the computer-readable medium may include a “computer-readable storage medium” and a “computer-readable signal medium”.

Contrary to pure signal transmission, a carrier or a signal, the “computer-readable storage medium” is a medium and/or a device that can persistently store information, and/or a tangible storage apparatus. Therefore, the computer-readable storage medium is a non-signal bearing medium. The computer-readable storage medium includes hardware such as volatile and non-volatile, removable and non-removable media and/or storage devices implemented by using a method or a technology suitable for storing information (such as a computer-readable instruction, a data structure, a program module, a logic element/circuit or other data). Examples of the computer-readable storage medium may include, but are not limited to, a RAM, a ROM, an EEPROM, a flash memory, or another memory technology, a CD-ROM, a digital versatile disk (DVD), or another optical storage apparatus, a hard disk, a cassette magnetic tape, a magnetic tape, a magnetic disk storage apparatus, or another magnetic storage device, or another storage device, a tangible medium, or an article of manufacture that is suitable for storing expected information and may be accessed by a computer.

The "computer-readable signal medium" is a signal bearing medium configured to send an instruction to hardware of the computing device 910, for example, by using a network. A signal medium can typically embody a computer-readable instruction, a data structure, a program module, or other data in a modulated data signal such as a carrier, a data signal, or another transmission mechanism. The signal medium further includes any information transmission medium. The term "modulated data signal" is a signal that has one or more of features thereof set or changed in such a manner as to encode information in the signal. By way of example, and not limitation, a communication medium includes a wired medium such as a wired network or direct-wired connection, and a wireless medium such as a sound medium, an RF medium, an infrared medium, and another wireless medium.

As described above, the hardware element 914 and the computer-readable medium 912 represent an instruction, a module, a programmable device logic and/or a fixed device logic that are implemented in the form of hardware, which may be used, in some embodiments, for implementing at least some aspects of the technologies described herein. The hardware element may include a component of an integrated circuit or a system-on-a-chip, an application-specific integrated circuit (ASIC), a field-programmable gate array (FPGA), a complex programmable logic device (CPLD), and another implementation in silicon or another hardware device. In such a context, the hardware element may be used as a processing device for executing a program task defined by an instruction, a module, and/or a logic embodied by the hardware element, as well as a hardware device for storing an instruction for execution, such as the computer-readable storage medium described above.

The above combination can also be used to implement various technologies and modules described herein. Therefore, software, hardware or a program module and another program module may be implemented as one or more instructions and/or logic that are embodied on a particular form of a computer-readable storage medium, and/or embodied by one or more hardware elements 914. The computing device 910 may be configured to implement a specific instruction and/or function corresponding to a software and/or hardware module. Therefore, for example, by using the computer-readable storage medium and/or the hardware element 914 of the processing system, the module can be implemented, at least partially in hardware, as a module that can be executed as software by the computing device 910. The instruction and/or function may be executable/operable by one or more articles of manufacture (such as one or more computing devices 910 and/or processing systems 911) to implement the technologies, modules, and examples described herein.

In various implementations, the computing device 910 may use various different configurations. For example, the computing device 910 may be implemented as a computer type device including a personal computer, a desktop computer, a multi-screen computer, a laptop computer, a netbook, and the like. The computing device 910 may also be implemented as a mobile apparatus type device including a mobile device such as a mobile phone, a portable music player, a portable game device, a tablet computer, or a multi-screen computer. The computing device 910 may also be implemented as a television type device including a device having or connected to a generally larger screen in a casual viewing environment. The devices include a television, a set-top box, a game console, and the like.

The technologies described herein may be supported by the various configurations of the computing device 910, and are not limited to specific examples of the technologies described herein. The function may also be completely or partially implemented on a "cloud" 920 by using a distributed system such as a platform 922 as described below.

The cloud 920 includes and/or represents the platform 922 for a resource 924. The platform 922 abstracts an underlying function of hardware (such as a server device) and software resources of the cloud 920. The resource 924 may include an application and/or data that can be used when computer processing is performed on a server device away from the computing device 910. The resource 924 may also include a service provided through the Internet and/or a subscriber network such as a cellular or Wi-Fi network.

The platform 922 can abstract the resource and the function to connect the computing device 910 to another computing device. The platform 922 may also be used for abstracting scaling of resources to provide a corresponding level of scale to encountered demand for the resource 924 implemented through the platform 922. Therefore, in an interconnection device embodiment, the implementation of the functions described herein may be distributed throughout the system 900. For example, the function may be partially implemented on the computing device 910 and through the platform 922 that abstracts the function of the cloud 920. In some embodiments, the computing device 910 may send the exported pure speech signal to a speech recognition application (not shown) residing on the cloud 920 for recognition. In an implementation, the computing device 910 may also include a local speech recognition application (not shown).

Various different embodiments are described in the discussion herein. It is to be comprehended and understood that each of the embodiments described herein may be used alone or in association with one or more other embodiments described herein.

Although the subject matter has been described in language specific to structural features and/or methodological acts, it is to be understood that the subject matter limited in the appended claims is not necessarily limited to the foregoing specific features or acts. Rather, the foregoing specific features and acts are disclosed as example forms of implementing the claims. Although the operations are described in the accompanying drawings as being performed in a particular order, it is not to be understood that such operations have to be performed in the particular order shown or in sequence, and it is not to be understood either that all the operations shown have to be performed to obtain an expected result.

By studying the accompanying drawings, the disclosure, and the appended claims, a person skilled in the art can understand and implement variations of the disclosed embodiments when practicing the claimed subject matter. In the claims, the term "comprise" does not exclude other elements or steps, and the indefinite article "a" or "an" does not exclude a plurality. The only fact that some measures are recorded in mutually different dependent claims does not indicate that a combination of these measures cannot be used to advantage.

What is claimed is:

1. A speech noise reduction method, performed by a computing device that is communicatively connected to a user terminal, the computing device having a processor and a memory storing a plurality of instructions to be executed by the processor, the method comprising:

establishing a network connection between the computing device and the user terminal;

obtaining, via the network connection between the computing device and the user terminal, a noisy speech signal, the noisy speech signal having a plurality of frames and including a pure speech signal and a noise signal;

estimating an a posteriori signal-to-noise ratio and an a priori signal-to-noise ratio of the noisy speech signal in a linear frequency domain, further comprising:

performing first noise estimation to obtain a first estimation of a variance of the noise signal;

estimating the a posteriori signal-to-noise ratio by using the first estimation of the variance of the noise signal; and estimating the a priori signal-to-noise ratio by using the estimated a posteriori signal-to-noise ratio;

determining a speech/noise likelihood ratio in a Bark domain based on the estimated a posteriori signal-to-noise ratio and the estimated a priori signal-to-noise ratio, including:

calculating, for a respective frame of the plurality of frames of the noisy speech signal at a respective frequency, a respective speech/noise likelihood ratio in the linear frequency domain based on a Gaussian probability density assumption using the estimated a posteriori signal-to-noise ratio and the estimated a priori signal-to-noise ratio, wherein the respective speech/noise likelihood ratio is $$\Delta(k, l) = \frac{\exp\left(\frac{\hat{\xi}(k, l)\hat{\gamma}(k, l)}{(1+\hat{\xi}(k, l))}\right)}{(1+\hat{\xi}(k, l))}, \Delta(k, l)$$

being the speech/noise likelihood ratio of a $l^{th}$ frame of the noisy speech signal on a $k^{th}$ frequency point, $\hat{\xi}$(k, l) being an estimated a priori signal-to-noise ratio of the $l^{th}$ frame on the $k^{th}$ frequency point, and $\hat{\gamma}$(k,l) being an estimated a posteriori signal-to-noise ratio of the $l^{th}$ frame on the $k^{th}$ frequency point; and converting the respective speech/noise likelihood ratio Δ(k,l) from the linear frequency domain to $$\Delta(b, l) = \frac{\exp\left(\frac{\hat{\xi}(b, l)\hat{\gamma}(b, l)}{(1+\xi(b, l))}\right)}{(1+\hat{\xi}(b, l))}$$

in the Bark domain, b being a frequency point in the Bark domain;

estimating an a priori speech existence probability based on the determined speech/noise likelihood ratio;

in accordance with a determination that the estimated a priori speech existence probability being greater than or equal to a second threshold:

performing, independently of the first noise estimation, second noise estimation to obtain a second estimation of the variance of the noise signal; and selectively re-estimating the a posteriori signal-to-noise ratio and the a priori signal-to-noise ratio in a predetermined frequency range by using the second estimation of the variance of the noise signal;

determining a gain based on the re-estimated a posteriori signal-to-noise ratio, the re-estimated a priori signal-to-noise ratio, and the estimated a priori speech existence probability;

converting the noisy speech signal into an estimation of the pure speech signal using the gain; and exporting, to the user terminal via the network connection, the estimation of the pure speech signal from the noisy speech signal based on the gain, thereby enabling the user terminal to perform speech recognition.

2. The method according to claim 1, wherein the performing first noise estimation comprises:

smoothing an energy spectrum of the noisy speech signal in a frequency domain and a time domain;

performing minimum tracking estimation on the smoothed energy spectrum; and selectively updating the first estimation of the variance of the noise signal in a current frame of the noisy speech signal depending on a ratio of the smoothed energy spectrum to the minimum tracking estimation of the smoothed energy spectrum, and by using the first estimation of the variance of the noise signal in a previous frame of the noisy speech signal and the energy spectrum of the current frame of the noisy speech signal.

3. The method according to claim 2, wherein the selectively updating comprises:

performing the update in response to the ratio being greater than or equal to a first threshold.

4. The method according to claim 2, wherein the selectively updating comprises:

skipping the update in response to the ratio being less than a first threshold.

5. The method according to claim 1, wherein the transforming from a linear frequency domain to the Bark domain is based on the following equation:

$$b = 13 * \arctan(0.76 * f_{kHz}) + 3.5 * \arctan\left(\frac{f_{kHz}}{7.5}\right)^2,$$

wherein $f_{kHz}$ is a frequency in the linear frequency domain.

6. The method according to claim 1, wherein estimating the a priori speech existence probability comprises:

smoothing Δ(b,l) to log(Δ(b, l))=β*log(Δ(b, l−1))+(1−β)*log(Δ(b, l)) in a logarithm domain, β being a smoothing factor; and obtaining the estimated a priori speech existence probability by mapping log(Δ(b,l)) in a full band of the Bark domain.

7. The method according to claim 6, wherein the mapping is $$P_{frame}(l) = \tanh\left(\frac{1}{24}\sum_{b=1}^{24}\log(\Delta(b, l))\right),$$

wherein $P^{frame}(l)$ is the estimated a priori speech existence probability.

8. The method according to claim 1, wherein performing the second noise estimation comprises:

selectively updating the second estimation of the variance of the noise signal in a current frame of the noisy speech signal depending on the estimated a priori speech existence probability, and by using the second estimation of the variance of the noise signal in a previous frame of the noisy speech signal and an energy spectrum of the current frame of the noisy speech signal.

9. The method according to claim 8, wherein the selectively updating comprises:

skipping the update in response to the estimated priori speech existence probability being less than a second threshold.

10. The method according to claim 1, wherein the selectively re-estimating the a priori signal-to-noise ratio and the a posteriori signal-to-noise ratio comprises:

performing the re-estimating in response to the sum of the magnitudes of the first estimation of the variance of the noise signal in the predetermined frequency range being greater than or equal to a third threshold.

11. The method according to claim 1, wherein the selectively re-estimating the a priori signal-to-noise ratio and the a posteriori signal-to-noise ratio comprises:

skipping the re-estimating in response to the sum of the magnitudes of the first estimation of the variance of the noise signal in the predetermined frequency range being less than a third threshold.

12. A computing device for speech noise reduction, the computing device communicatively connected to a user terminal and comprising a processor and a memory, the memory being configured to store a plurality of instructions that, when executed by the processor, cause the computing device to perform a plurality of operations including:

establishing a network connection between the computing device and the user terminal;

obtaining, via the network connection between the computing device and the user terminal, a noisy speech signal, the noisy speech signal having a plurality of frames and including a pure speech signal and a noise signal;

estimating an a posteriori signal-to-noise ratio and an a priori signal-to-noise ratio of the noisy speech signal in a linear frequency domain, further comprising:

performing first noise estimation to obtain a first estimation of a variance of the noise signal;

estimating the a posteriori signal-to-noise ratio by using the first estimation of the variance of the noise signal; and estimating the a priori signal-to-noise ratio by using the estimated a posteriori signal-to-noise ratio;

determining a speech/noise likelihood ratio in a Bark domain based on the estimated a posteriori signal-to-noise ratio and the estimated a priori signal-to-noise ratio, including:

calculating, for a respective frame of the plurality of frames of the noisy speech signal at a respective frequency, a respective speech/noise likelihood ratio in the linear frequency domain based on a Gaussian probability density assumption using the estimated a posteriori signal-to-noise ratio and the estimated a priori signal-to-noise ratio, wherein the respective speech/noise likelihood ratio is $$\Delta(k,l) = \frac{\exp\left(\frac{\hat{\xi}(k,l)\hat{\gamma}(k,l)}{(1+\hat{\xi}(k,l))}\right)}{(1+\hat{\xi}(k,l))},\ \Delta(k,l)$$

being the speech/noise likelihood ratio of a $l^{th}$ frame of the noisy speech signal on a $k^{th}$ frequency point, $\hat{\xi}(k, l)$ being an estimated a priori signal-to-noise ratio of the $l^{th}$ frame on the $k^{th}$ frequency point, and $\hat{\gamma}(k,l)$ being an estimated a posteriori signal-to-noise ratio of the $l^{th}$ frame on the $k^{th}$ frequency point; and converting the respective speech/noise likelihood ratio $\Delta(k,l)$ from the linear frequency domain to $$\Delta(b,l) = \frac{\exp\left(\frac{\hat{\xi}(b,l)\hat{\gamma}(b,l)}{(1+\hat{\xi}(b,l))}\right)}{(1+\hat{\xi}(b,l))}$$

in the Bark domain, b being a frequency point in the Bark domain;

estimating an a priori speech existence probability based on the determined speech/noise likelihood ratio;

in accordance with a determination that the estimated a priori speech existence probability being greater than or equal to a second threshold:

performing, independently of the first noise estimation, second noise estimation to obtain a second estimation of the variance of the noise signal; and selectively re-estimating the a posteriori signal-to-noise ratio and the a priori signal-to-noise ratio in a predetermined frequency range by using the second estimation of the variance of the noise signal;

determining a gain based on the re-estimated a posteriori signal-to-noise ratio, the re-estimated a priori signal-to-noise ratio, and the estimated a priori speech existence probability;

converting the noisy speech signal into an estimation of the pure speech signal; and exporting, to the user terminal via the network connection, the estimation of the pure speech signal from the noisy speech signal based on the gain, thereby enabling the user terminal to perform speech recognition.

13. The computing device according to claim 12, wherein the plurality of operations further comprises:

performing, independently of the first noise estimation, second noise estimation to obtain a second estimation of the variance of the noise signal; and selectively re-estimating the a posteriori signal-to-noise ratio and the a priori signal-to-noise ratio depending on a sum of magnitudes of the first estimation of the variance of the noise signal in a predetermined frequency range, and by using the second estimation of the variance of the noise signal, the determining a gain comprising: determining the gain based on the re-estimated a posteriori signal-to-noise ratio, the re-estimated a priori signal-to-noise ratio and the estimated a priori speech existence probability in response to the re-estimating being performed.

14. A non-transitory computer-readable storage medium storing a plurality of instructions that, when executed by a processor of a computing device that is communicatively connected to a user terminal, cause the computing device to perform a plurality of operations including:

establishing a network connection between the computing device and the user terminal;

obtaining, via the network connection between the computing device and the user terminal, a noisy speech signal, the noisy speech signal having a plurality of frames and including a pure speech signal and a noise signal;

estimating an a posteriori signal-to-noise ratio and an a priori signal-to-noise ratio of the noisy speech signal in a linear frequency domain, further comprising:

performing first noise estimation to obtain a first estimation of a variance of the noise signal;

estimating the a posteriori signal-to-noise ratio by using the first estimation of the variance of the noise signal; and estimating the a priori signal-to-noise ratio by using the estimated a posteriori signal-to-noise ratio;

determining a speech/noise likelihood ratio in a Bark domain based on the estimated a posteriori signal-to-noise ratio and the estimated a priori signal-to-noise ratio, including:

calculating, for a respective frame of the plurality of frames of the noisy speech signal at a respective frequency, a respective speech/noise likelihood ratio in the linear frequency domain based on a Gaussian probability density assumption using the estimated posteriori signal-to-noise ratio and the estimated priori signal-to-noise ratio, wherein the respective speech/noise likelihood ratio is $$\Delta(k,l)=\frac{\exp\left(\frac{\hat{\xi}(k,l)\hat{\gamma}(k,l)}{\left(1+\hat{\xi}(k,l)\right)}\right)}{\left(1+\hat{\xi}(k,l)\right)},\ \Delta(k,l)$$

being the speech/noise likelihood ratio of a $l^{th}$ frame of the noisy speech signal on a $k^{th}$ frequency point, $\hat{\xi}(k, l)$ being an estimated a priori signal-to-noise ratio of the $l^{th}$ frame on the $k^{th}$ frequency point, and $\hat{\gamma}(k,l)$ being an estimated a posteriori signal-to-noise ratio of the $l^{th}$ frame on the $k^{th}$ frequency point; and converting the respective speech/noise likelihood ratio $\Delta(k,l)$ from the linear frequency domain to $$\Delta(b,l)=\frac{\exp\left(\frac{\hat{\xi}(b,l)\hat{\gamma}(b,l)}{\left(1+\hat{\xi}(b,l)\right)}\right)}{\left(1+\hat{\xi}(b,l)\right)}$$

in the Bark domain, b being a frequency point in the Bark domain;

estimating an a priori speech existence probability based on the determined speech/noise likelihood ratio;

in accordance with a determination that the estimated a priori speech existence probability being greater than or equal to a second threshold:

performing, independently of the first noise estimation, second noise estimation to obtain a second estimation of the variance of the noise signal; and selectively re-estimating the a posteriori signal-to-noise ratio and the a priori signal-to-noise ratio in a predetermined frequency range by using the second estimation of the variance of the noise signal;

determining a gain based on the re-estimated a posteriori signal-to-noise ratio, the re-estimated a priori signal-to-noise ratio, and the estimated a priori speech existence probability;

converting the noisy speech signal into an estimation of the pure speech signal using the gain; and exporting, to the user terminal via the network connection, the estimation of the pure speech signal from the noisy speech signal based on the gain, thereby enabling the user terminal to perform speech recognition.

* * * * *